United States Patent [19]

Janke et al.

[11] Patent Number: 4,649,854
[45] Date of Patent: Mar. 17, 1987

[54] OVER-TEMPERATURE INDICATOR DEVICE FOR FREEZERS

[75] Inventors: Donald E. Janke, Benton Township, Berrien County; William J. Linstromberg, Lincoln Township, Berrien County, both of Mich.

[73] Assignee: Whirlpool Corporation, Benton Harbor, Mich.

[21] Appl. No.: 815,390

[22] Filed: Dec. 31, 1985

[51] Int. Cl.4 ............................................. G01K 1/02
[52] U.S. Cl. .................................. 116/216; 116/215; 116/221; 116/281; 62/128
[58] Field of Search ....................... 116/216–218, 116/203, 204, 221, 281, 283, 215, 100; 374/22, 23, 205, 106; 337/88, 89, 90, 98, 344; 62/128, 125, 127, 129; 73/649

[56] References Cited

U.S. PATENT DOCUMENTS

| | | | |
|---|---|---|---|
| 1,526,315 | 2/1925 | Bradshaw | 116/215 |
| 2,362,424 | 11/1944 | Walsh | 116/216 |
| 2,375,859 | 5/1945 | Marcy | 337/344 |
| 2,843,076 | 7/1958 | Cook et al. | 116/203 |
| 3,117,550 | 1/1964 | Cole | 116/221 |
| 3,870,983 | 3/1975 | Kato et al. | 337/107 |
| 3,898,860 | 8/1975 | Shepherd et al. | 62/155 |

FOREIGN PATENT DOCUMENTS

| | | | |
|---|---|---|---|
| 2071280 | 9/1971 | France | 116/217 |
| 48403 | 3/1984 | Japan | 73/649 |

*Primary Examiner*—Charles Frankfort
*Assistant Examiner*—W. Morris Worth
*Attorney, Agent, or Firm*—Hill, Van Santen, Steadman & Simpson

[57] ABSTRACT

An over-temperature indicator for freezers includes an indicator pin slidable mounted within a cylindrical housing in which is mounted a bistable bimetal thermostat disk which is engaged by a magnet mounted to an end of the indicator pin. A cup shaped insulator is mounted over a substantial portion of the cylindrical housing to provide a thermal time delay. An over-temperature condition triggers the bistable bimetal disk to snap, causing the magnet to release and enabling gravity to urge the indicator pin into an indicating position.

10 Claims, 3 Drawing Figures

U.S. Patent   Mar. 17, 1987   4,649,854
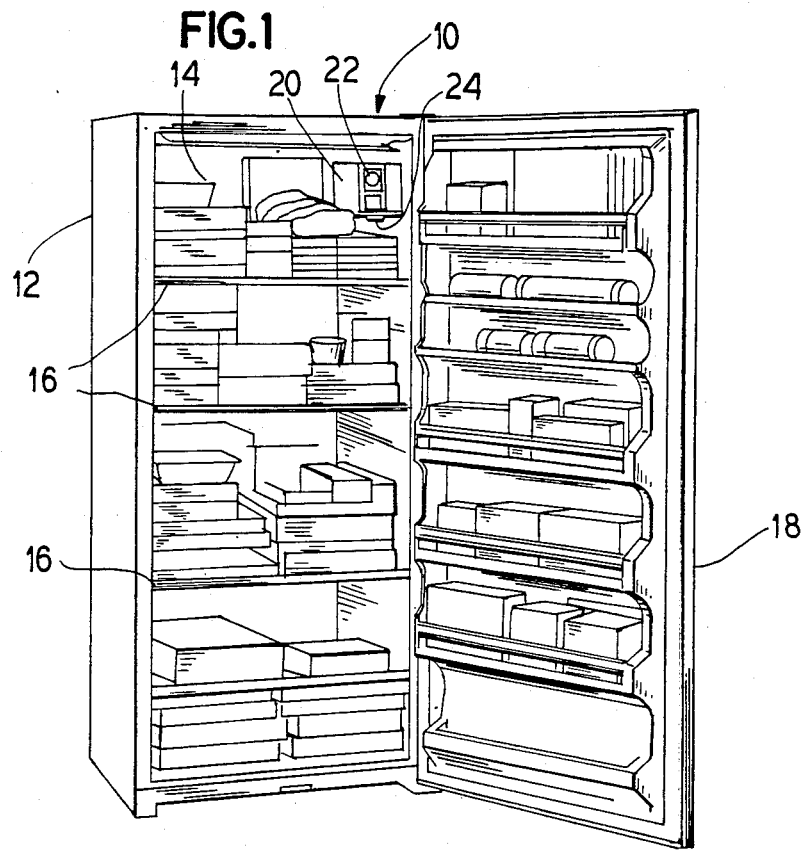
FIG.1
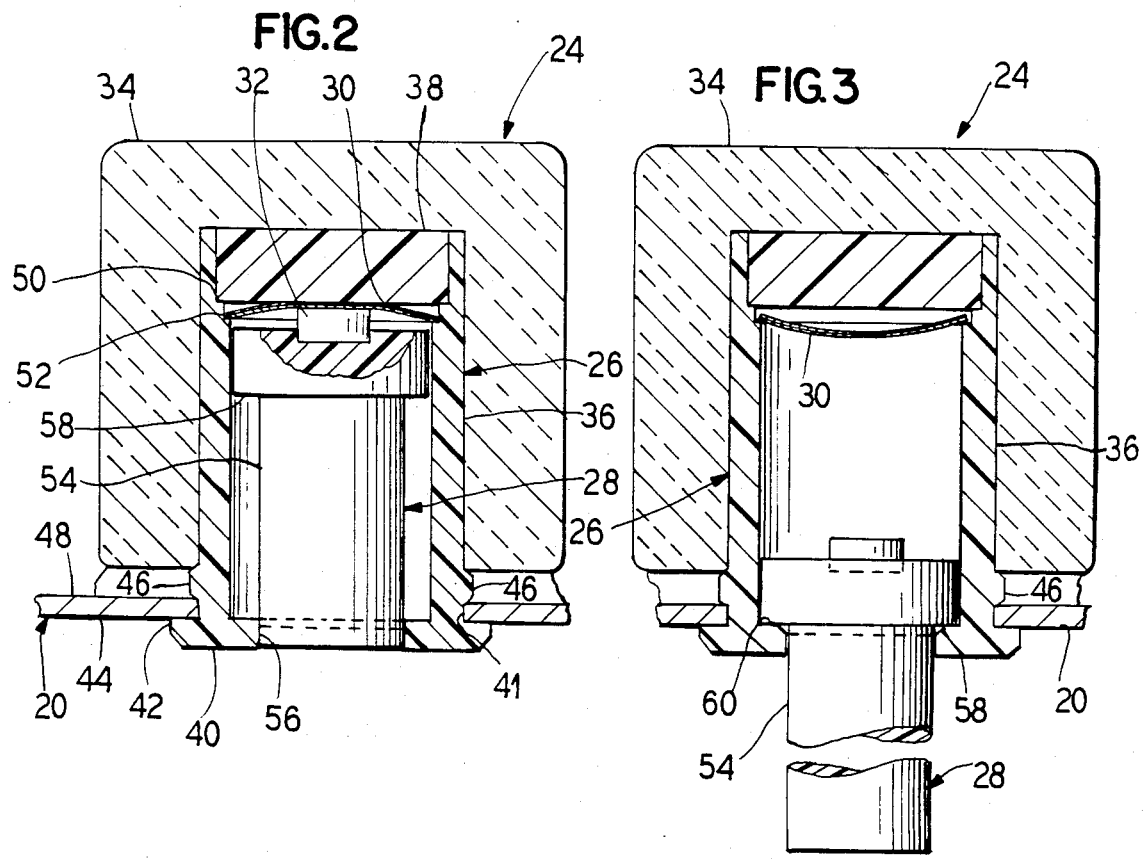
FIG.2
FIG.3

OVER-TEMPERATURE INDICATOR DEVICE FOR FREEZERS

BACKGROUND OF THE INVENTION

1. Field of the Invention

The present device relates to a temperature indicator having a gravity biased indicating pin for showing that the interior of a freezer has reached an over-temperature, or thaw, condition.

2. Description of the Prior Art

Temperature indicators are known in which gravity influences an indicating means; for instance, in U.S. Pat. No. 2,362,424 a multiple position temperature indicator includes gravity actuated semaphores to show movement of a bimetal strip having two opposed legs. In U.S. Pat. No. 1,595,734, an adjustable lever with a hook engages a bimetallic element to hold an indicator until a predetermined temperature condition is reached, at which time the bimetal moves to release the hook and enables the indicator to fall to an open position.

In U.S. Pat. No. 3,452,706, a snap action bimetal releases a latch that enables a spring to move a plunger outward to an indicating position. An indicator for sensing the depletion of toner within a copier is disclosed in U.S. Pat. No. 3,915,340 in which a magnet on a pivot arm is attracted to a magnetic carrier in the toner. When the toner is depleted, the pivot arm moves to close a switch that illuminates a light.

SUMMARY OF THE INVENTION

The present invention provides an inexpensive yet effective over-temperature indicator for use in freezers which is simple to manufacture and provides a positive indication of an over-temperature condition. A snap action bimetal temperature indicating disk and a gravity urged indicator pin magnetically engageable thereto is included in a device adapted for mounting within the compartment of a freezer to show that an over-temperature condition has occurred. The present device is preferably mounted near the thermostat unit within the freezer for convenience and, more importantly, so that it is removed from any heat source within the freezer, such as a motor. Insulating material is provided around the over-temperature device to shield the device from sudden changes in temperature, such as might occur during opening of the freezer door or during a defrost cycle.

During normal operation, the present device remains virtually hidden from view in the freezer compartment. However, when an over-temperature condition occurs within the freezer compartment, such as might occur during an extended power outage, the present device provides a clear indication of the occurrence of an over-temperature condition. In a preferred embodiment, a red or color-coded indicator pin drops into view within the freezer compartment. To reset the present device, the indicator pin is simply urged upwardly toward the hidden position where it magnetically engages the bimetal thermostat.

BRIEF DESCRIPTION OF THE DRAWINGS

FIG. 1 is a perspective view of an upright freezer including an over-temperature indicator according to the principles of the present invention;

FIG. 2 is an enlarged cross-section of the over-temperature indicator in a non-indicating position; and FIG. 3 is an enlarged cross-section of the indicator of FIG. 2, shown in an over-temperature indicating position.

DESCRIPTION OF THE PREFERRED EMBODIMENTS

In FIG. 1, a freezer is indicated generally at 10 including an insulated cabinet 12 having a freezer compartment 14 with a plurality of shelves 16 and having a door 18 hingedly mounted to the cabinet 12. Within the freezer compartment 14 is a control box 20 having a control dial 22 for adjusting the temperature within the freezer 10 and, at an underside of the control box 20, is mounted an over-temperature indicating device 24 of the present invention.

The over-temperature indicating device 24, shown in FIG. 2, includes generally a tubular housing 26, an indicator pin 28, a bimetal thermostat 30, a magnet 32, and an insulator case 34. More particularly, the housing 26 is generally cylindrical in shape, having cylinder walls 36 with an end cap 38 mounted at a first end thereof and a mounting face portion 40 at a second end thereof. The mounting face portion of the housing 26 extends through and is mounted in an annular opening 41 in the control box 20. A radially outwardly projecting flange 42 engages a first, outer surface 44 of the control box 20, while projections 46 extending from the cylindrical wall 36 engage a second, inside surface 48 of the control box 20. The projections 46 are relatively small to enable the tubular housing 26 to be inserted through the opening 41 and snapped in place.

The end cap 38 is received within the first end of the cylindrical housing 26 where it abuts a annular inwardly projecting edge 50 to enclose the first end of the housing 26 yet provide clearance for the thermostat 30. On a second inwardly projecting edge 52 spaced somewhat from the first edge 50 rests the disk-shaped bimetal thermostat 30. The thermostat 30 is a bistable disk which deforms with a snap when a predetermined temperature is encountered. The deformation causes the normally concave surface of the disk 30 to assume a convex shape. Slidably mounted within the cylindrical walls 36 is the indicator pin 28 which includes an elongated indicating portion 54 which has a diameter slightly less than the diameter of an opening 56 in the mounting face 40 of the housing 26. The indicator pin 28 also includes an outwardly projecting flange 58 that is somewhat larger in diameter than the opening 56 to prevent the pin 28 from being completely removed from the housing 26. Centrally disposed at an end 57 of the indicator pin 28 is the magnet 32, which may be affixed thereto by glue, or the like, or instead may be embedded slightly in the indicator pin 28, as shown in FIG. 2. The magnet 32 magnetically engages the bimetal thermostat disk 30 to hold the indicator pin 28 in a non-indicating position substantially within the housing 26.

The housing 26 is partially enclosed by the insulator case 34 which is a cup-shaped member mounted over the closed end of the housing 26. The insulator case is made of inexpensive insulating material, such as a plastic foam, and provides a thermal time delay for the actuation of the thermostat 30.

The present device operates as follows: under normal temperature conditions within the freezer compartment 14, the device 24 remains in the non-indicating position illustrated in FIG. 2. The magnet 32 abuts and magnetically engages the thermostat 30 to counter the urging of gravity and keep the pin 28 within the housing 26. However, when a thawing condition occurs within the freezer compartment 14 and the temperature begans to rise, the warmer temperature is transmitted to the bimetal thermostat disk 30.

Before reaching the thermostat 30, the heat must be transmitted through the insulator case 34 and the material of the housing 26, which provide a thermal time delay to compensate for sudden temperature changes. Thus, brief increases in the temperature of the freezer compartment 14 above the thermostat 30 trip temperature, such as may occur during opening of the freezer door 18, are not transmitted to the thermostat disk 30. Likewise, relatively brief increases in temperature, such as would occur during a defrost cycle for the freezer 10, are not transmitted to the thermostat disk 30. However, prolonged warming of the freezer compartment 14 enables the warmer temperatures to be transmitted through the insulator 34 and the housing 26 to trigger the thermostat disk 30. Such prolonged temperature increase would allow food contained within the freezer 10 to thaw and could be the result of an extended power outage or the freezer door 18 being left open for an extended time.

Once such extended rise in temperature has occurred, the bimetal thermostat disk 30 snaps into the deformed position shown in FIG. 3 and, in so doing, forces the indicator pin 28 downwardly such that the momentum of the pin 28 causes the magnet 32 to release from the bimetal disk 30. Once the magnet 32 is released from the disk 30, gravity urges the indicator pin 28 downwardly until the flange 58 catches on an annular shelf 60 projecting inwardly adjacent the opening 56. The pin 28 is now in an indicating position with the portion 54 extending from the housing 26. Thus, upon the occurence of an over-temperature condition as sensed by the thermostat disk 30, the indicator pin 28 becomes visable within the freezer compartment 14.

Should the compartment temperature of the freezer 10 return to normal, the bimetal thermostat will return to its original shape, but the indicator pin 28 will remain in the indicator position. Thus, even if the thawed food is refrozen, the existence of an earlier over-temperature condition—and possibly spoiled food—is indicated. Resetting of the device 24 is accomplished by simply pushing the pin 28 upwardly until the magnet 32 engages the disk 30.

In a preferred embodiment, the thermostat disk 30 is a bimetal bistable disk having a trip temperature of approximately 28 degrees Fahrenheit, a temperature above which frozen food may begin to thaw. The indicator pin 28 is preferably color coded, for example, of a red color, or some other highly visible color, so that it is easily noticed within the freezer compartment 14.

Thus, there has been described an over-temperature indicator 24 for use in freezers wherein a magnet 32 holds an indicator pin 28 in a non-indicating position until an over-temperature condition is sensed by a bistable bimetal disk 30, at which time the bistable disk 30 snaps to cause the indicator pin to drop to an indicating position. An insulator case 34 provides a predetermined thermal time delay to prevent triggering of the indicator device 24 during brief over-temperature conditions, yet enables the present device 24 to operate effectively for extended over-temperature conditions. The present over-temperature indicator 24 is simple to manufacture, effective in operation and very low in cost.

As is apparent from the foregoing specification, the present invention is susceptible to being embodied with various alterations and modifications which may differ particularly from those that I have described in the preceding specification and description. It should be understood that I wish to embody within the scope of the patent granted hereon all such modifications as reasonably and properly come within the scope of my contribution to the art.

The embodiments of the invention in which an exclusive property or privilege is claimed are defined as follows:

1. An over-temperature indicator device for use in freezers, comprising:
   a housing mountable in a freezer compartment;
   a bistable thermostat mounted within said housing to sense a predetermined over-temperature condition;
   an indicator pin disposed within said housing and being slidable between a first non-indicating position and a second indicating position, a thermostat engaging face of said indicator pin being adjacent said thermostat when said indicator pin is in said non-indicating position, a portion of said indicator pin projecting from said housing when said indicator pin is in said indicating position;
   said thermostat moving abruptly in the direction of said indicator pin upon the occurrence of said over-temperature condition; and
   a magnet mounted at said thermostat engaging face of said indicator pin for selectively magnetically engaging said thermostat to maintain said indicator pin in said non-indicating position, said abrupt movement of said thermostat in the direction of said indicator pin causing said magnet to disengage said thermostat;
   whereby said indicator pin moves into said indicating position when said magnet disengages said thermostat.

2. An over-temperature indicator device as claimed in claim 1, further comprising:
   an insulator case surrounding a portion of said housing to provide a thermal time delay between said over-temperature condition being reached in the freezer compartment and said abrupt movement of said thermostat in the direction of said indicator pin.

3. An over-temperature indicator device as claimed in claim 1, wherein:
   said indicator pin includes an enlarged portion adjacent said thermostat engaging face and a constricted portion for projecting from said housing; and
   said housing is hollow and includes a constricted opening through which said constricted portion projects when in said indicating position, said opening forming a rim projecting inwardly to engage said enlarged portion when said indicator pin is in said indicating position.

4. An indicator device as claimed in claim 1,
   wherein said indicator pin is maintained substantially within said housing by said magnet engaging said bistable thermostat when said indicator pin is in said non-indicating position and
   wherein said indicator device is adapted for mounting so that gravity urges said indicator pin toward said indicating position.

5. An over-temperature indicator device for use in freezers having a control box comprising:

a cylindrical housing having a mounting face portion adapted for mounting in an opening in said control box, said mounting face portion defining an opening therethrough, a second end of said cylindrical housing opposite said mounting face portion including an end cap means for closing said second end;

a bistable thermostat disk mounted within said cylindrical housing adjacent said second end, said thermostat disk abruptly deforming in response to predetermined temperature changes;

an indicator pin slidably mounted within said cylindrical housing and having first and second opposed ends, said first opposed end being coextensive with said opening at said mounting face portion, said second opposed end being adjacent said bistable thermostat disk when said indicator pin is in a non-indicating position, said indicator pin being slidable to an indicating position wherein said first opposed end of said pin extends beyond said cylindrical housing;

a permanent magnet mounted at said second opposed end of said indicator pin for magnetic engagement with said bistable thermostat disk; and a cup shaped insulating member mounted over said second end of said cylindrical housing to provide a thermal time delay;

said thermostat disk abruptly deforming upon the occurrence of an over-temperature condition to abruptly move said indicator pin toward said indicating position and cause said magnet to disengage from said thermostat disk.

6. A device as claimed in claim 5, wherein said first opposed end of said pin is of a highly visible color.

7. A device as claimed in claim 5, wherein said bistable thermostat disk deforms at approximately 28 degrees Fahrenheit.

8. A device as claimed in claim 5, wherein said cylindrical housing and said indicator pin are formed of plastic, and said insulating member is of plastic foam.

9. In combination, a housing made of insulative material mountable within a freezer and having a recess formed therein opening out of one wall of said housing, a bi-metal biased thermostat fixed within a portion of said recess inside of said housing, said thermostat being biased to snap toward said opening when the temperature of said thermostat exceeds a given level, a movable element having a first end conforming in shape and size to said recess, said first end abutting below said thermostat when said movable element is in a concealed position within said housing, magnetic means between said housing and said first end of said movable element for retaining said movable element in said concealed position within the interior of said housing when said bi-metal thermostat is below said given temperature level but said magnetic retention being overcome by the force of said thermostat snapping downwardly and moving said movable element from said concealed position so that said movable element will fall gravitationally to an exposed position having a portion thereof outside of said housing, whereby said movable element gives a visible signal of a temperature over said given level in said freezer when in the exposed position.

10. A temperature indicator, comprising:

a housing having a recess therein and an opening providing access to said recess;

a bistable thermostat fixed within said recess and having at least two states, said thermostat being formed to change state with a dynamic reaction;

a movable element disposed within said recess and being movable so that a first portion thereof extends through said opening, a second opposite portion of said movable element being movable to adjacent said thermostat;

magnetic means between said housing and said movable element for retaining said movable element in a concealed position within said recess when said bistable thermostat is within a predetermined temperature range but said magnetic retention being overcome by movement of said movable element caused by the dynamic reaction upon a change of state of said thermostat when said thermostat is outside said predetermined temperature range so that said movable element will move gravitationally to a position extending through said opening;

whereby said movable element provides an indication of an out of range temperature condition.

* * * * *